United States Patent
Gregg et al.

(10) Patent No.: US 6,501,853 B1
(45) Date of Patent: Dec. 31, 2002

(54) APPARATUS AND METHOD FOR PROCESSING VIDEO DATA

(75) Inventors: Leon Edward Gregg, Rochester, MN (US); William Jaaskelainen, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 1306 days.

(21) Appl. No.: 08/818,208

(22) Filed: Mar. 14, 1997

Related U.S. Application Data

(63) Continuation of application No. 08/266,907, filed on Jun. 27, 1994, now abandoned.

(51) Int. Cl.$^7$ .................................................. G06K 9/34
(52) U.S. Cl. ........................ 382/173; 382/180; 382/282
(58) Field of Search .............................. 382/180, 282, 382/232, 233, 234, 235, 236, 239, 248, 173; 358/453, 462; 348/397, 399, 400

(56) References Cited

U.S. PATENT DOCUMENTS

| | | | | |
|---|---|---|---|---|
| 4,189,711 A | * | 2/1980 | Frank ......................... | 382/180 |
| 4,288,697 A | | 9/1981 | Albert ......................... | 250/505 |
| 4,723,298 A | | 2/1988 | Schiller ....................... | 382/56 |
| 4,730,215 A | | 3/1988 | Jose et al. .................... | 358/140 |
| 4,809,350 A | | 2/1989 | Shimoni et al. ............... | 382/56 |
| 4,899,394 A | * | 2/1990 | Lee ........................... | 382/176 |
| 4,903,317 A | | 2/1990 | Nishihara et al. ............. | 382/56 |
| 4,941,042 A | * | 7/1990 | Martens ....................... | 358/133 |
| 5,025,309 A | | 6/1991 | Isnardi ........................ | 358/12 |
| 5,051,840 A | * | 9/1991 | Watanabe et al. ............. | 358/433 |
| 5,065,246 A | | 11/1991 | Takemoto et al. ............ | 358/227 |
| 5,071,209 A | | 12/1991 | Chang et al. ................. | 359/19 |
| 5,093,653 A | | 3/1992 | Ikehira ........................ | 340/727 |
| 5,121,152 A | | 6/1992 | Wagner ....................... | 384/402 |
| 5,138,465 A | * | 8/1992 | Ng et al. ..................... | 358/462 |
| 5,151,949 A | * | 9/1992 | Miyata ........................ | 382/238 |
| 5,267,333 A | * | 11/1993 | Aono et al. .................. | 382/166 |
| 5,359,673 A | * | 10/1994 | Beaujardiere ................ | 382/229 |
| 5,384,700 A | * | 1/1995 | Lim et al. .................... | 707/531 |
| 5,408,328 A | * | 4/1995 | Boliek et al. ................. | 358/261.4 |
| 5,481,372 A | * | 1/1996 | Kouno et al. ................ | 358/433 |
| 5,524,071 A | * | 6/1996 | Yokomizo .................... | 382/284 |
| 5,623,681 A | * | 4/1997 | Rivette et al. ............... | 707/522 |
| 5,684,898 A | * | 11/1997 | Brady et al. ................. | 382/282 |

OTHER PUBLICATIONS

Schlig et al., "CCD Imaging Device With Center–Weighted Area Averaging", IBM Technical Disclosure Bulletin, vol. 34, No. 7A, Dec. 1991, pp. 392–395.

Dom et al., "Multiple Curve Detection Using the Minimal Description Length Principle and the Hough Transform", IBM Technical Disclosure Bulletin, vol. 34, No. 7B, Dec. 1991, pp. 407–412.

H. Yamamoto, "Data Bus Direct Access for Image Data", IBM Technical Disclosure Bulletin, vol. 34, No., 5, Oct. 1991, p. 189.

* cited by examiner

Primary Examiner—Mark Wallerson
(74) Attorney, Agent, or Firm—Terrance A. Meador

(57) ABSTRACT

An apparatus an method are disclosed for dividing a two-dimensional matrix of pixels into at least first and second areas. For each pixel, it is determined in which the area the pixel is located. Then, the pixels in the first area are processed according to a first processing/compression scheme, and the pixels in the second area are processed according to a second processing/compression scheme. A data bit stream is generated which represents the processed/compressed pixels and their associated areas, and the data bit stream can be stored or transmitted in lieu of the entire matrix of pixels. If desired, the pixels in the first area can be processed less frequently than the pixels in the second area, and the areas themselves can be established in response to the frequency of variations in the pixel values.

21 Claims, 8 Drawing Sheets

APPARATUS AND METHOD FOR PROCESSING VIDEO DATA

This application is a continuation, of application number 08/266,907, filed Jun. 27, 1994 now abandoned.

BACKGROUND OF THE INVENTION

1. Field of the Invention

The present invention relates generally to video data processing, and more particularly to efficiently transmitting and storing video data.

2. Description of the Related Art

The area of multimedia is a large and still-growing industry which stores, processes, and transmits data and programs in multimedia formats. Multimedia programming includes, among other things, educational and entertainment audio-visual programs. Because of the world-wide acceptance of multimedia programming, and the demand for ever more such programming, the multimedia industry has launched several large-scale efforts geared toward providing multimedia programming on demand.

Most commonly, a multimedia program consists of both audio data and visual data. With current technology, video data is generated by filming an object and generating a series of raster-scanned video images of the object. Each image is established by a two-dimensional matrix of picture elements, referred to as "pixels", and the data record established by each matrix is relatively large, i.e., the data record established by each matrix contains a relatively large number of pixels.

In many approaches common in the art, each pixel defines a numerical value (currently an integer in the range 0–255) which represents a color or a color and an intensity. To transmit or store an image, a bit stream representing all of the pixels in the matrix and their associated values is generated and then stored or transmitted as appropriate.

Typically, when a multimedia program includes a video display, about thirty such images of an object must be generated and processed for each second of viewing time. It accordingly can be appreciated that a single video program requires the storage and/or transmission of a large number of relatively large data records, on the order of tens of megabits per second. Indeed, according to the May-June 1992 issue of the MIT Technology Review, "video is a glutton for bandwidth" which consequently can "saturate" many existing networks, particularly in the event that a single network must handle more than a few video transmissions. Such a consideration is of growing importance in light of the advent of video-on-demand discussed above.

Accordingly, to reduce the amount of a multimedia program's video data which must be stored and/or transmitted, methods have been introduced for "compressing" video data. Data compression essentially omits from the bit stream that is to be transmitted certain data in a particular data record. For example, in video image transmission, a simple compression technique may include, in the bit stream to be transmitted, only data which represents pixels that have changed relative to the immediately preceding image frame. Many other compression techniques exist which compress data to relatively lesser or greater degrees.

As the skilled artisan will appreciate, a trade-off exists in determining how much to compress video data. More particularly, it is the case that relatively great compression results in less data to transmit, but also tends to undesirably result in corruption of the image that is received for display.

Nonetheless, current compression techniques ordinarily are not tailored to a particular program or application. Likewise, current compression techniques do not permit a user to modify or otherwise tailor the compression processing to a particular program or application.

This is unfortunate, because a compression technique that may be suitable for one program may not be suitable for another. For example, a technique which compresses data to a relatively large degree may be suitable for a program in which relatively little on-screen activity occurs, but may be unsuitable for a program having a large amount of on-screen activity, because a large degree of data compression could corrupt the video image in such a program an unacceptable amount. Likewise, a technique that compresses data a relatively small degree may be suitable for a program in which much on-screen activity occurs, but would be an inefficient technique for a program having a small amount of on-screen activity, because much data would be unnecessarily included in the bit stream. Further, it is often the case in video programs that not all on-screen activity is equally important, yet the entire image typically is subjected to a single compression technique. As can be inferred from the above discussion, this can result in either unacceptable corruption of important portions of the image or inefficient transmission of bit streams which include more data than is necessary.

Accordingly, it is an object of the present invention to provide a system for interactively establishing one or more compression techniques for a pixel matrix. Another object of the present invention is to provide a system for dynamically establishing a compression technique for a pixel matrix. Still another object of the present invention is to provide a method and apparatus for establishing compression techniques which is easy to use and cost-effective.

SUMMARY OF THE INVENTION

A computer system for processing a video image includes a central processing unit (CPU) and at least one data record representative of a video image frame. The data record, which is accessible by the CPU, includes a plurality of elements that represent a plurality of pixels arranged in a matrix.

A boundary definer establishes first and second areas of the matrix, and a locator is operably engaged with the boundary definer for determining, for at least some of the pixels, which of the pixels are located in the first area and which of the pixels are located in the second area. A pixel processor is operably engaged with the locator for processing the elements representing the pixels in the first area in accordance with a first processing scheme and for processing the elements representing the pixels in the second area in accordance with a second processing scheme.

Preferably, the pixel processor generates a bit stream which is representative of the pixels and the area of each. Also, the system preferably includes an I/O device for selectively causing the bit stream to be stored in a storage device or transmitted across a communications network. If desired, the bit stream representing the pixels in the first area is compressed relative to the number of pixels in the first area.

In one embodiment of the present invention, the video program defines a sampling cycle, and the system further includes a timer for establishing a sampling interval threshold which is longer than the sampling cycle. As intended by the present invention, the pixel processor processes the elements representing the pixels in the second area each sampling cycle, and the pixel processor processes the elements representing the pixels in the first area each sampling interval threshold. Additionally, each pixel defines a corresponding variable value, and the boundary definer can establish the first and second areas in response to variations in the values of the pixels.

In another aspect of the present invention, an apparatus for processing data elements representing an image includes means for establishing first and second areas of the image, and means for determining, for at least some of the elements, which of the elements are located in the first area and which of the elements are located in the second area. Also, the apparatus includes means for processing the elements in the first area in accordance with a first processing scheme and for processing the elements in the second area in accordance with a second processing scheme.

In still another aspect of the present invention, a method is disclosed for processing data representing pixels arranged in a matrix. The method of the present invention includes defining at least first and second areas within the matrix and determining which pixels are within the first area and which pixels are within the second area. Then, the data representing pixels in the first area is processed in accordance with a first processing scheme, while the data representing pixels in the second area is processed in accordance with a second processing scheme.

In yet another aspect of the present invention, a system for processing pixels of a video image which defines a sampling cycle includes a data record. The data record in turn includes a matrix of pixels which represent an image, and the matrix is defined by at least first and second areas. Also, a timer is provided for establishing a sampling interval threshold which is longer than the sampling cycle. Furthermore, a pixel processor processes the pixels in the first area each sampling cycle and processes the pixels in the second area each sampling interval threshold.

In another aspect of the present invention, a method for processing pixels includes the steps of providing a data record that includes a matrix of pixels representing an image, wherein the matrix is defined by at least first and second areas. A sampling cycle and a sampling interval threshold are established such that the sampling interval threshold is longer than the sampling cycle, and the pixels in the first area are processed each sampling cycle. On the other hand, the pixels in the second area are processed each sampling interval threshold.

In yet another aspect of the present invention, a method for processing pixels which are arranged in a two-dimensional matrix includes the steps of establishing first and second areas of the matrix, and then determining, for at least some of the pixels, which of the pixels are located in the first area and which of the pixels are located in the second area. Next, the pixels in the first area are processed in accordance with a first processing scheme, while the pixels in the second area are processed in accordance with a second processing scheme.

The details of the present invention, both as to its structure and operation, can best be understood with reference to the accompanying drawings, in which like reference numerals refer to like parts, and in which:

BRIEF DESCRIPTION OF THE PREFERRED EMBODIMENTS

DETAILED DESCRIPTION OF THE PREFERRED EMBODIMENTS

Figure 1:
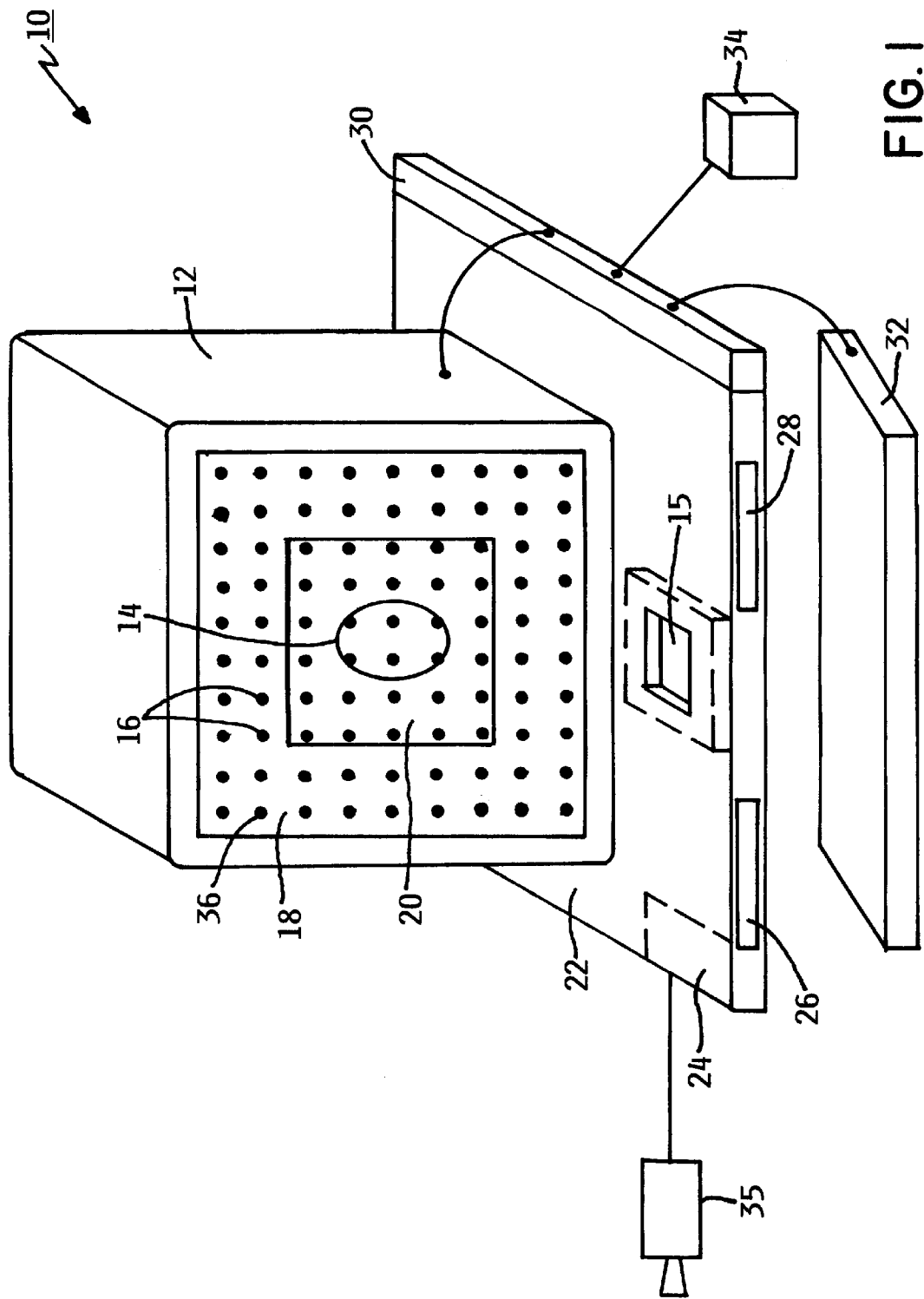
FIG. 1 is a perspective view of the apparatus for processing video data of the present invention.

Referring initially to FIG. 1, a computer system for processing video program data is shown, generally designated 10. As shown in FIG. 1, the system 10 includes a monitor 12 for presenting a video display of an image 14 of an object, e.g., a person's face. In accordance with principles well-known in the art, the video monitor 12 is a raster-scanned monitor which includes a matrix of picture elements, referred to herein as "pixels", 16, and the pixels 16 establish the image 14 which is presented on the video display 12. Although not ordinarily individually detectable by the human eye, for clarity of disclosure the pixels 16 are shown in FIG. 1, and the spacing between adjacent pixels 16 shown in FIG. 1 is greatly exaggerated.

Typically, about thirty (30) image frames per second of the video program to be processed are generated. As intended by the present invention, a sampling cycle is defined to be the inverse of the number of frames per second of the video program.

In accordance with the present invention, the matrix of pixels 16 includes a first area 18 and a second area 20. It is to be understood that the matrix of pixels 16 can be divided into a greater number of areas than two, and that the areas 18, 20 can have shapes other than quadrilateral, e.g., each area 18, 20 can be circularly-shaped or have a polygonal shape other than quadrilateral.

FIG. 1 shows that the system 10 includes a computer central processing unit (CPU) 22. As the skilled artisan will recognize, both still images and motion video images can be received by the CPU 22 for processing. Additionally, a video processor card 24 (shown in phantom in FIG. 1) is preferably operably associated with the CPU 22 for digitizing the video image from camera 35. Further, an optical data storage device 26 and a magnetic data storage device 28 can be electrically connected to the CPU 22 for storing records of video images. Computer system 10 also includes memory 13, which is a random access memory sufficiently large enough to hold the necessary programming and data structures. While memory 13 is shown as a single entity, it should be understood that memory 13 may in fact comprise a plurality of modules, and that memory can exist at multiple levels, from high-speed registers and caches to lower speed but larger DRAM chips. Memory 13 contains control program 15, which comprises a plurality of machine instructions that execute on CPU 22 to carry out this invention as described in more detail in the flowcharts of FIGS. 3–7. The contents of memory 13 can be loaded to and stored from magnetic data storage device 28 as needed. In the preferred embodiment, control program 15 processes (as described below) the digitized video images that are output from video processor card 24 and displays the images on monitor 12. Alternatively, control program 15 can process digitized images received across a communications line from a network (not shown). After processing, the video images can be stored in storage devices 26 and 28 or transmitted across a communications network.

Moreover, an input/output (I/O) controller 30 is electrically connected to the CPU 22 for interfacing the CPU 22 with the video monitor 12 and with appropriate control devices, e.g., a keyboard 32 and a mouse 34. The CPU 22 is advantageously a mainframe computer or personal computer such as an IBM AS/400 or PS/2 computer system. Also, the video processor card 24, camera 35, storage devices 26, 28, I/O controller 30, keyboard 32, and mouse 34 can all be off-the-shelf components.

In accordance with the present invention and as disclosed below, the boundaries of each of the first and second areas 18, 20 are established, and then the locations of the pixels 16 (typically in Cartesian coordinates) are correlated to either one of the areas 18, 20. Next, data elements representing the pixels 16 that are located in the first area 18 of the matrix of pixels 16 can be processed using a first compression algorithm, and data elements representing the pixels 16 that are located in the second area 20 of the matrix of pixels 16 can be processed using a second compression algorithm. Although in this example two areas 18 and 20 are shown with two corresponding compression algorithms, it should be understood that more than two areas with more than two compression algorithms could be used. As intended by the present invention, the term "pixel" is used interchangeably to refer to both the video elements of the monitor 12 that establish the image 14, and the data elements of a data record which digitally represent the matrix of pixels 16 and which are generated after the pixels 16 have been digitized by the video processor card 24.

The compressed pixels 16 can then be parsed by area into a bit stream that represents the image displayed on the video monitor 12. Alternatively, the pixels 16 can be parsed by area into a bit stream that represents the image displayed on the video monitor 12 prior to compression, with the bit stream then being subjected to compression by means well-known in the art.

Figure 2:
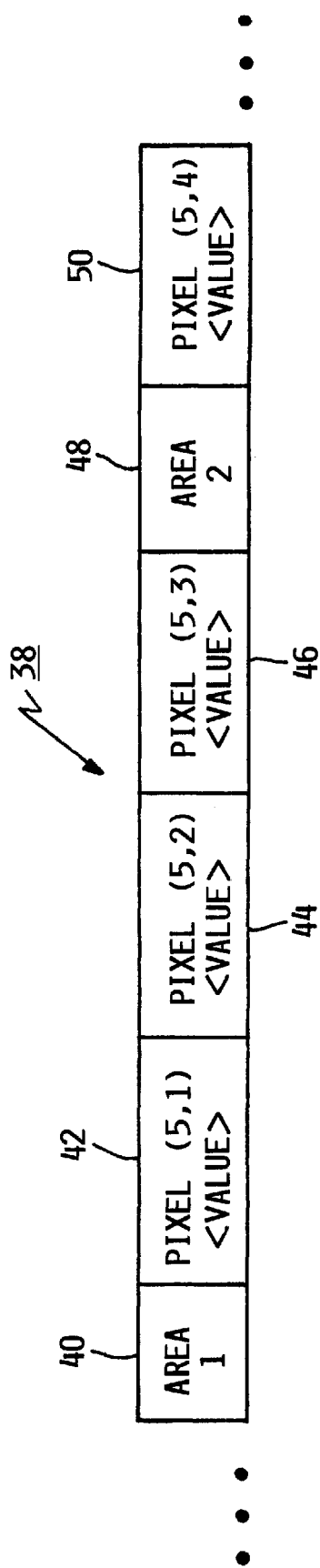
FIG. 2 is a schematic diagram of a bit stream of the present invention.

FIG. 2 shows one example of a bit stream of the present invention. As shown in FIG. 2, taking the fifth pixel row 36 from the top of the monitor 12, a bit stream 38 has a first field 40 which indicates that the fields following the first field 40 represent pixels in the first area 18 of the matrix of pixels 16. A second field 42 represents the first (i.e., left-most) pixel 16 which is located in the fifth pixel row 36, along with the value of the pixel. This pixel is designated by its Cartesian coordinates (5,1). Likewise, third and fourth fields 44, 46 represent the second and third pixels 16 in the fifth pixel row 36 and the values of each.

A fifth field 48 functions essentially as a flag that the fields following the fifth field 48 represent pixels 16 which are located in the second area 20 of the matrix of pixels 16. A sixth field 50 represents the fourth pixel 16 which is located in the fifth pixel row 36, along with the value of the pixel. It is to be understood that the entire matrix of pixels 16 can be parsed into a bit stream in accordance with the principles disclosed above, either before or after area-by-area compression. The bit stream 38 is but one example of a data record that represents the pixels of a video image frame.

Figure 3A:
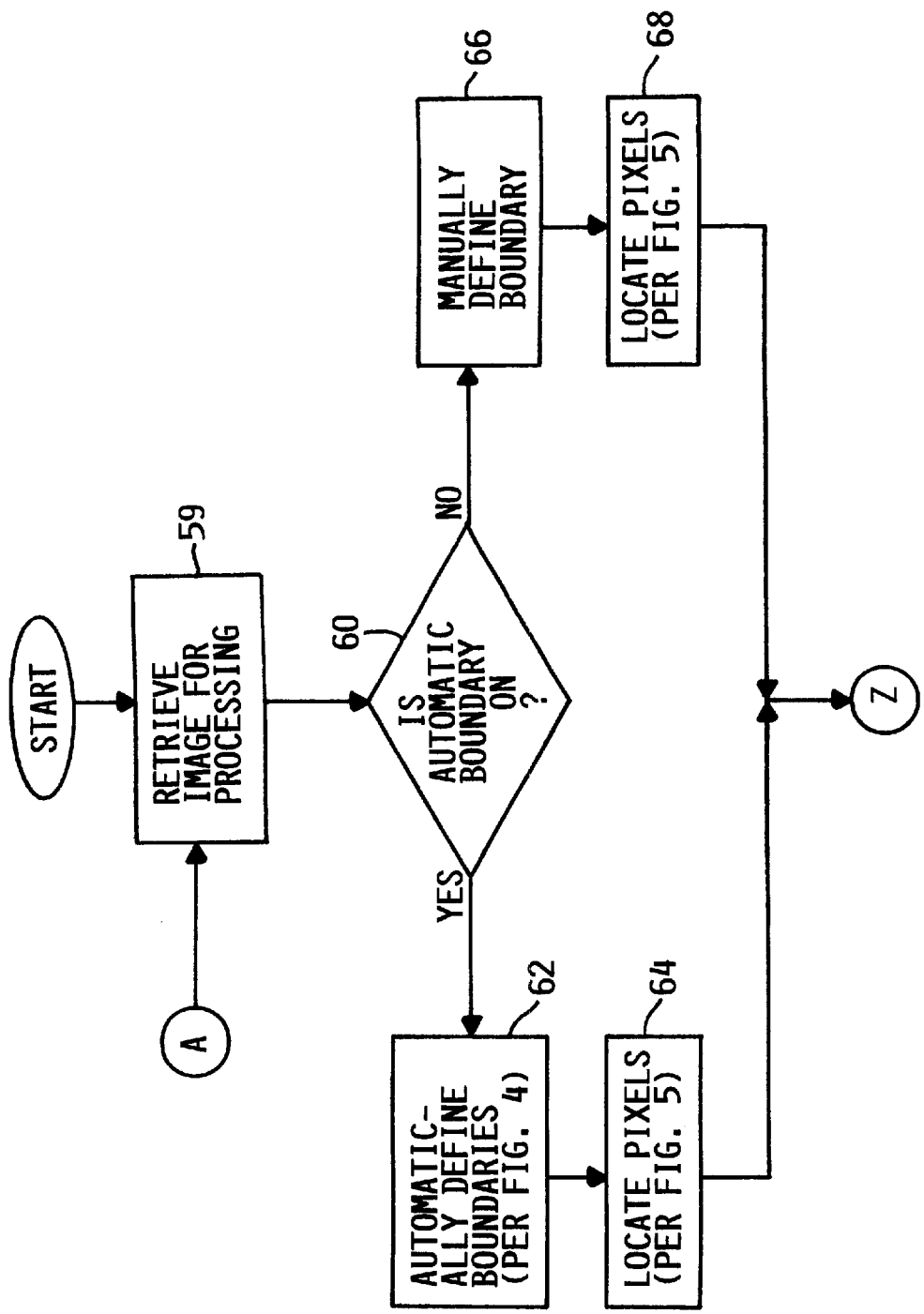
FIG. 3 is a flow chart of the overall method for processing video data of the present invention.
Figure 3B:
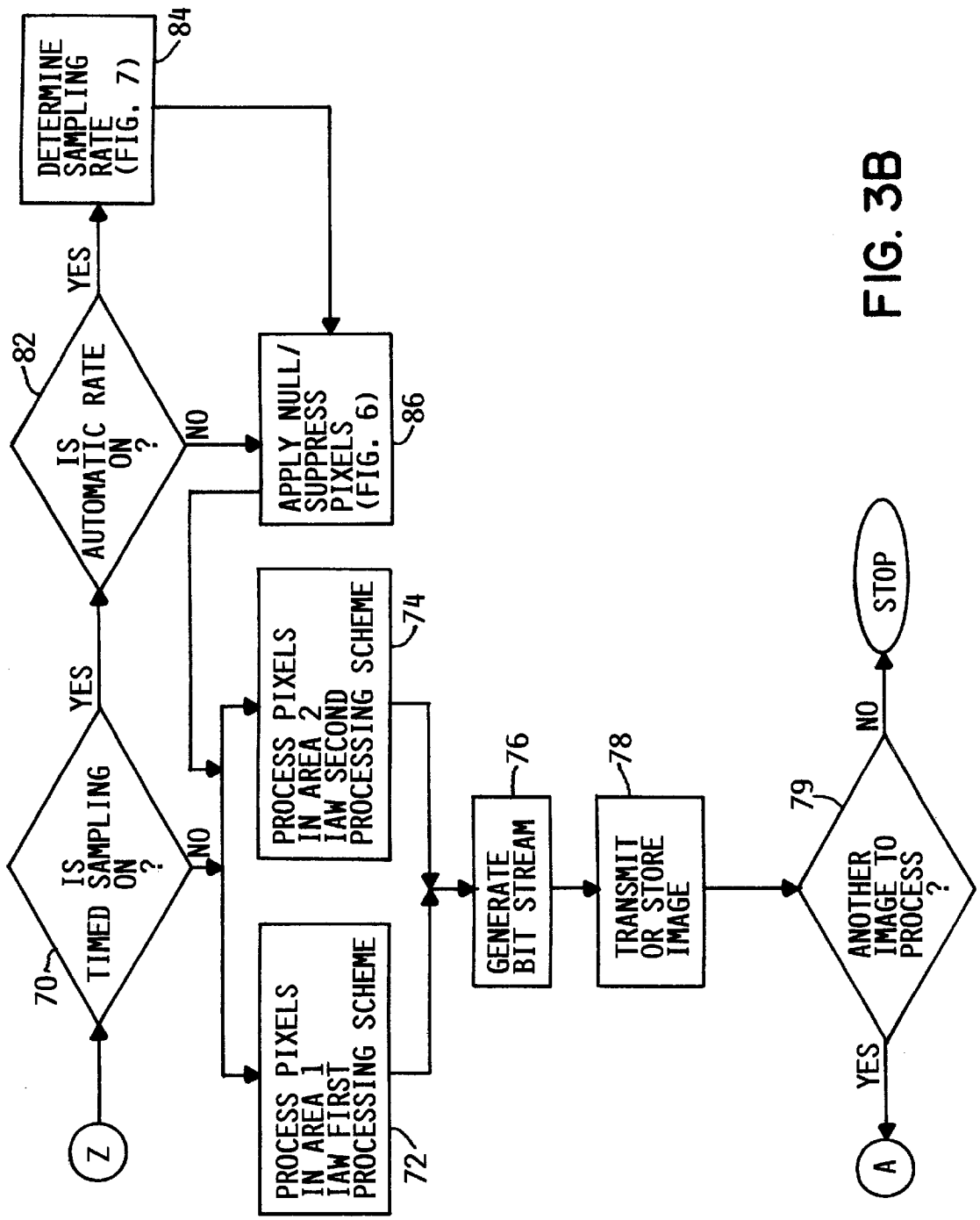

Now referring to FIG. 3, the overall method of processing video data in accordance with the present invention can best be appreciated. In this regard, FIG. 3 represents the structure and the function of the control program 15 shown in FIG. 1. As shown in FIG. 3, the control program 15 starts and the boundaries of the areas 18, 20 of the matrix of pixels 16 are initially established. First, an image is retrieved for processing (block 59). Then, at block 60, the control program 15 determines whether the operator of the system 10 has selected automatic boundary definition. Such a selection can be made by the operator using any suitable means, e.g., by appropriately manipulating the keyboard 32 or mouse 34.

If automatic boundary definition has been selected, the control program 15 proceeds to block 62, wherein the boundaries of the areas 18, 20 are determined as described below in reference to FIG. 4. Then, the process proceeds to block 64, wherein it is determined, for each pixel 16, whether the pixel 16 is located in the first area 18 of the matrix of pixels 16 or the second area 20 of the matrix of pixels 16, as discussed more fully below in reference to FIG. 5.

If, on the other hand, automatic boundary definition has not been selected, the process proceeds to block 66, wherein the boundaries of the areas 18, 20 are defined by the operator of the system 10 using appropriate display control means, e.g., the keyboard 32, mouse 34, touch-screen display, and so on. In manually defining the boundaries of the areas 18, 20, the operator may also select the shape of the areas 18, 20, e.g., circular, rectangular, polygonal, etc. For the display shown in FIG. 1, to define the rectangular areas 18, 20 shown, the operator could, e.g., sequentially position the cursor of the display on each of the four corners of the second area 20, depressing the operating switch of the mouse 34 at each corner or depressing the "Enter" key of the keyboard 32 at each corner. Alternatively, the boundaries of the areas 18, 20 of the matrix of pixels 16 can be pre-defined during initial programming.

From block 66, the process proceeds to block 68, wherein it is determined, for each pixel 16, whether the pixel 16 is located in the first area 18 of the matrix of pixels 16 or the second area 20 of the matrix of pixels 16. Thus, blocks 62 and 66 are boundary definers, and blocks 64 and 68 are pixel locators.

From block 64 or 68, the process moves to block 70, wherein it is determined whether the operator of the system 10 has selected a timed sampling feature described more fully below in reference to FIG. 6. As described below, the timed sampling feature of the present invention suppresses processing of pixels 16 which are located in an operator-selected one (or both) of the areas 18, 20 for a predetermined number of sample cycles, referred to herein as a sampling interval threshold. Stated differently, pixels 16 in a selected one of the areas 18, 20 are sampled (and, hence, are processed) less frequently than pixels 16 that are located in the other area 20, 18. Thus, block 70 is essentially a timer for establishing a sampling interval threshold.

If the timed sampling feature has not been selected at block 70, the process moves to blocks 72 and 74. At block 72, the pixels 16 that are located in the first area 18 of the matrix of pixels 16 are processed according to a first processing scheme, e.g., a first compression algorithm. In contrast, at block 74 the pixels 16 that are located in the second area 20 of the matrix of pixels 16 are processed according to a second processing scheme, e.g., a second compression algorithm. Thus, blocks 72 and 74 are pixel processors.

It may now be appreciated that the present invention envisions subjecting preselected areas of the image displayed on the video monitor 12 to a greater degree of compression than other areas. As but one example, the pixels 16 which establish the image 14 of the object of interest, shown in FIG. 1 as being located within the second area 20, may be subjected to relatively little compression, to thereby minimize corruption of the portion of the image that is a greatest interest to the video program. On the other hand, the pixels 16 that are located within the second area 18 may establish only background images, and may accordingly be subjected to a relatively great degree of compression, to conserve data storage requirements and transmission bandwidth.

From blocks 72 and 74 the process moves to block 76, wherein a bit stream representing the pixels 16, e.g., the bit stream 38 shown in FIG. 2, can be generated by means well-known in the art. It is to be understood that the bit stream 38 may be generated prior to data compression. Then, at block 78, the bit stream 38 is transmitted across a communications network or stored by one or both of the data storage devices 26, 28 shown in FIG. 1, as established by the operator of the system 10. At block 79, if images remain to be processed, the next image of the video program being displayed on the video monitor 12 is retrieved for processing at block 59. Otherwise the program stops.

If the operator of the system 10 has selected timed sampling at block 70, the process moves to block 82, wherein it is determined whether the operator has also selected the automatic sampling rate feature of the present invention, discussed in detail below in reference to FIG. 7. If so, the process moves to block 84 to determine the sampling rate, and then to block 86 to suppress pixels 16 from processing as described below in reference to FIG. 6. Otherwise, the process moves directly to block 86, and thence to blocks 72, 74 as appropriate.

Figure 4:
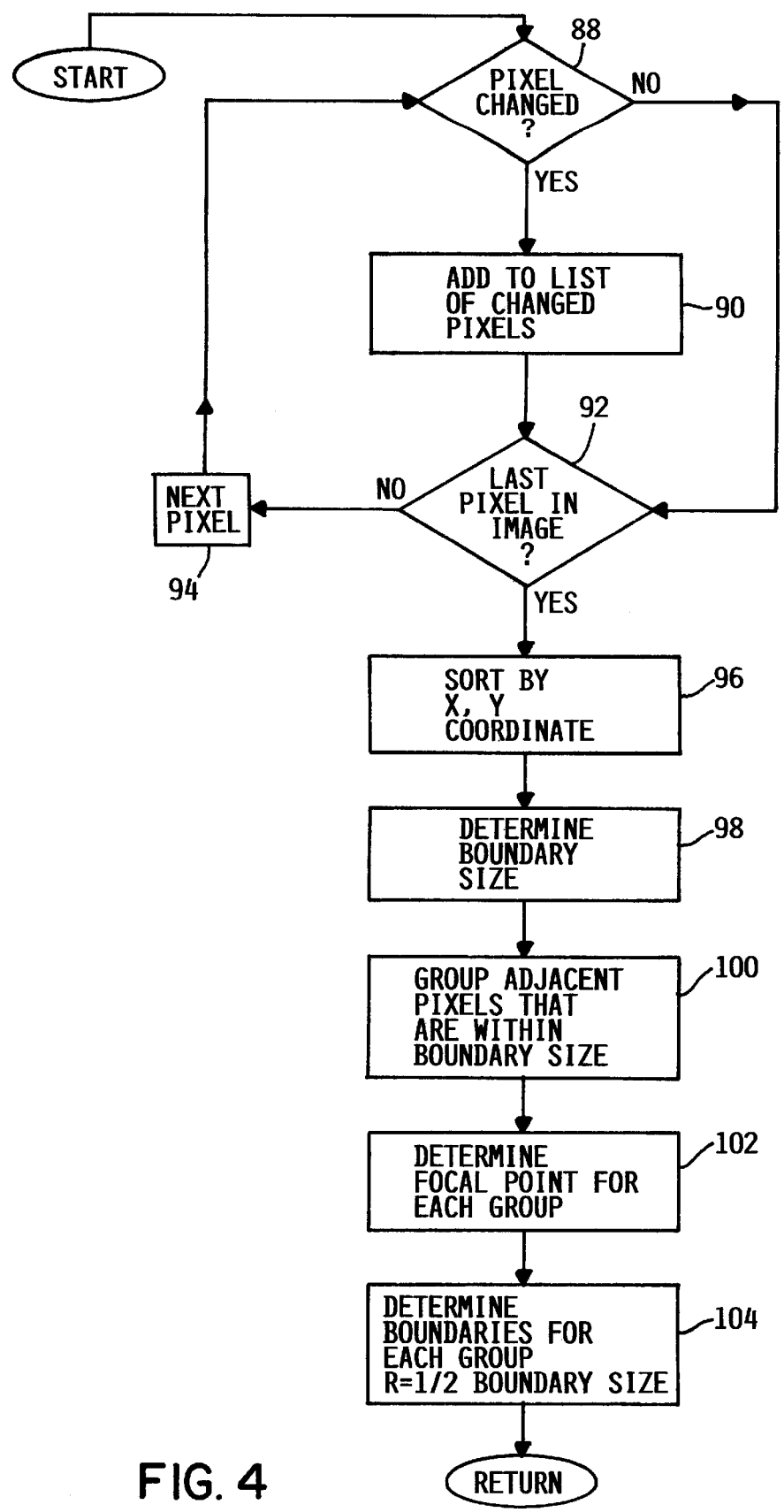
FIG. 4 is a flow chart of the autofocus boundary method for automatically determining area boundaries.

Now referring to FIG. 4, one presently preferred process by which the boundaries of the first and second areas 18, 20 of the matrix of pixels 16 are automatically defined by control program 15 can be appreciated. The process starts, and at block 88, for each pixel 16 it is determined whether the value of the pixel 16 under test has changed from its value in the immediately preceding image frame. If so, the pixel 16 is added to a list of changed pixels at block 90, and then the process moves to block 90 determine whether the pixel 16 under test is the last pixel 16 in the image frame. Also, if the value of the pixel 16 under test has not changed from its value in the immediately preceding image frame, the process moves directly to block 90.

If the test at block 90 is negative, the process moves to block 94 to retrieve the next pixel 16, and then moves back to block 88. Otherwise, the process moves to block 96, wherein the changed pixels 16 are sorted by their Cartesian coordinates. Then, at block 98, a nominal boundary size is determined. In one presently preferred embodiment, the nominal boundary size is defined to be twenty percent (20%) of the size of the area that would be established by the changed pixels 16, if the changed pixels 16 were arranged in a square matrix. Alternatively, the nominal boundary size can be defined to be some other percentage of the size of the area that would be established by the changed pixels 16, if the changed pixels 16 were arranged in, e.g., a circular pattern. The determination of the nominal boundary size can be accomplished by accessing a table which correlates number of changed pixels 16 to nominal boundary size.

From block 98, the process moves to block 100 to group together changed pixels 16 which are located nearby each other, i.e., which are located within a single nominal boundary size of each other. The groups could overlap, if desired. For example, one group per changed pixel 16 can be established. Alternatively, once the first group has been defined, the second group could be defined such that no changed pixels 16 in the first group were in the second group, and so on. As yet a third alternative, the changed pixels 16 simply may be grouped together by quadrant of the video monitor 12. It is to be understood that the groupings may be effected using these or other grouping schemes, depending upon, among other things, the computational speed of the CPU 22.

From block 100, the process moves to block 102 to determine which changed pixel 16 in each group of changed pixels 16 is the focal point of that group. In one presently preferred embodiment, for each group the changed pixel 16 having the mean Cartesian coordinates for that group is defined to be the focal point.

Next, at block 104, boundaries are determined for areas that correspond to each group of changed pixels 16. The process then returns to FIG. 3, block 64. In the presently preferred process, each area is defined by a circle centered on the focal point of each group and having a radius equal to one-half the nominal boundary size.

Accordingly, a plurality of areas may be defined by the method disclosed above. Assuming that areas having high concentrations of changed pixels 16 are of relatively great interest in the video program, each such area can be designated as an area to be processed using relatively little compression. The remaining areas would be processed using relatively great compression.

Figure 5:
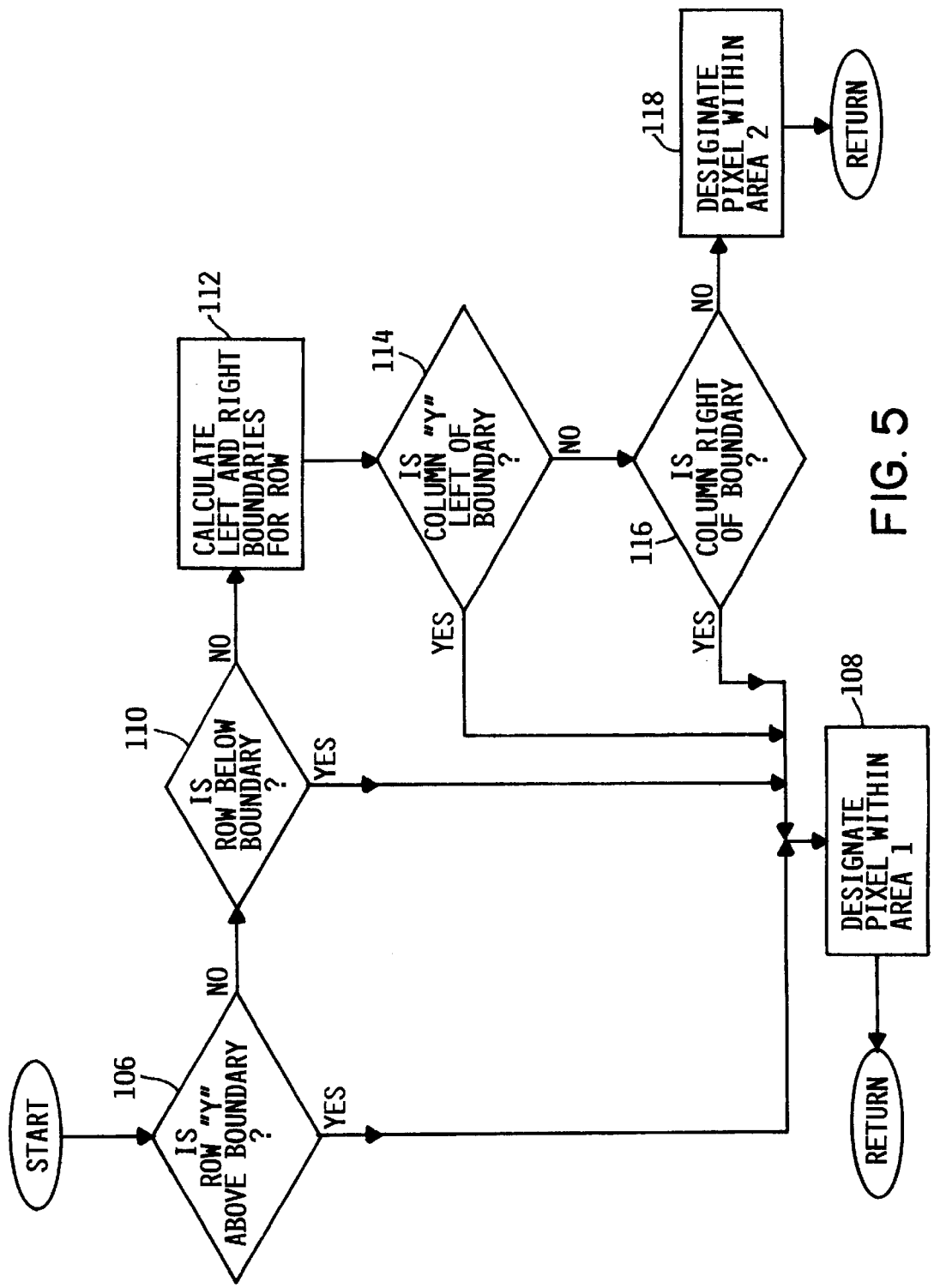
FIG. 5 is a flow chart of the method for locating pixels.

FIG. 5 shows the operation of the pixel locator of the present invention. Following start, for each pixel 16, at block 106 it is determined whether the pixel 16 under test is above the boundary of the second area 20 of the matrix of pixels 16. In other words, at block 106 it is determined whether the "y" coordinate of the pixel 16 is above the uppermost "y" coordinate of the boundary of the second area 20. If it is, the process proceeds to block 108 to designate the pixel 16 as being in the first area 18. The pixel 16 is then stored with a tag indicating that it is in the first area 18, or it is stored in a bin designated as the first area 18 bin and the control program 15 returns to FIG. 3, block 70.

If the test at block 106 is positive, no further pixels 16 in the same row need be tested. Thus, the process returns to block 106 to next test the first pixel 16 in the row immediately following the row of the pixel 16 that had been under test.

In contrast, if the test at block 106 is negative, the process moves to block 110 to determine whether the pixel 16 under test is below the boundary of the second area 20 of the matrix of pixels 16. If it is, the process moves to block 108 and then returns to FIG. 3, block 70. Otherwise, the process moves to block 112 to calculate the left and right boundaries of the second area 20 for the row under test by straightforward geometric means.

Next, at block 114, it is determined whether the column of the pixel 16 under test is left of the boundary of the second area 20. If it is, the process moves to block 108 and then returns to FIG. 3, block 70. Otherwise, the process moves to block 116 to determine whether the column of the pixel 16 under test is right of the boundary of the second area 20. If it is, the process moves to block 108 and returns to FIG. 3, block 70. Otherwise, the process moves to block 118 to designate the pixel 16 as being in the second area 20. The pixel 16 is then stored with a tag indicating that it is in the second area 20, or it is stored in a bin designated as the second area 20 bin. The process then returns to FIG. 3, block 70.

Figure 6:
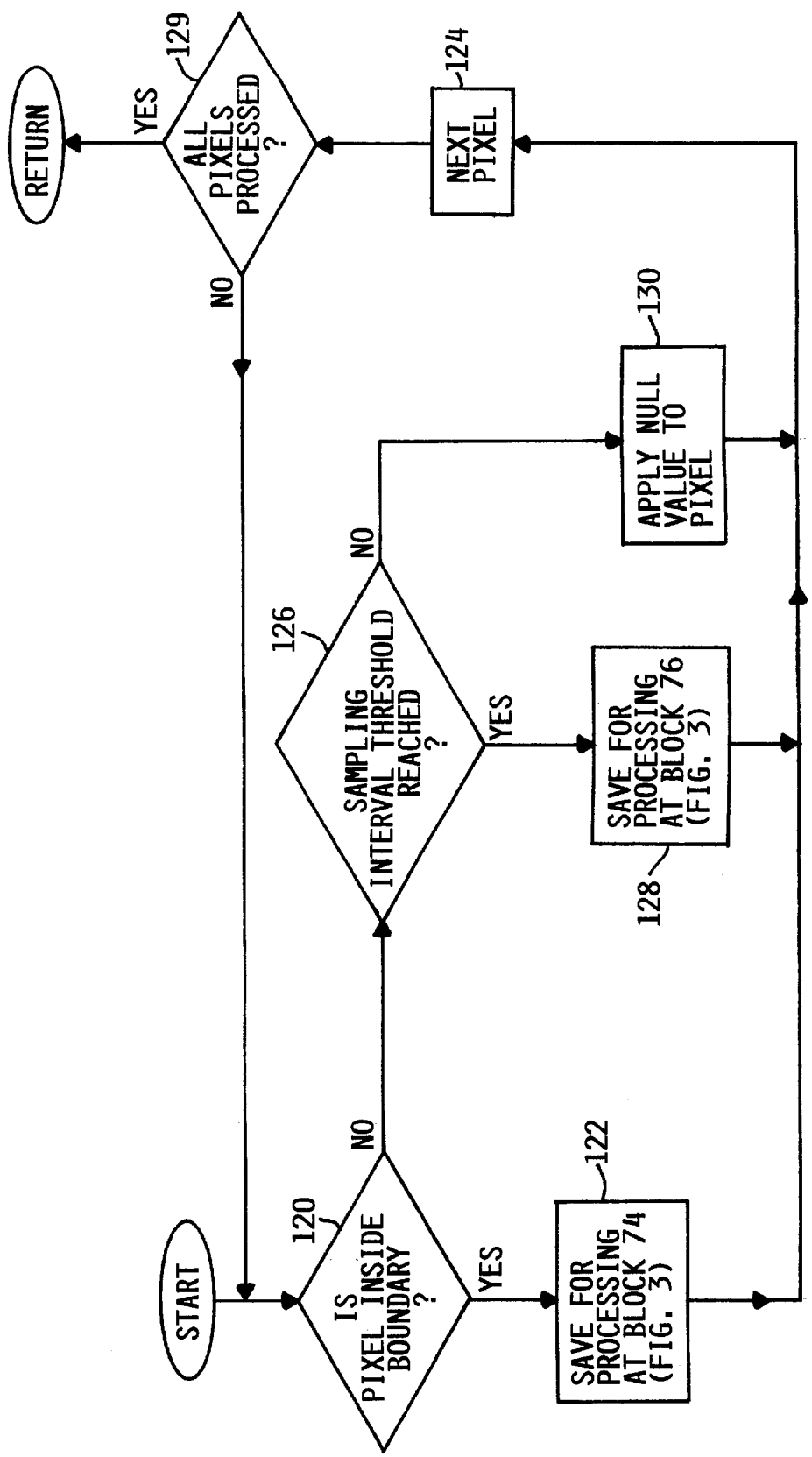
FIG. 6 is a flow chart of the pixel sampling suppression method.

Now referring to FIG. 6, which would be invoked if timed sampling had been selected by the operator of the system 10 at block 70 of FIG. 3, the process starts and, for each pixel 16 under test determines at decision 120 whether the pixel 16 is inside the boundary of the second area 20. This determination can be made by accessing the pixel locator described above in relation to FIG. 5. If the pixel 16 under test is inside the boundary of the second area 20, at block 122 the pixel 16 is saved for processing at block 74 of FIG. 3, and the process moves to block 124 to retrieve the next pixel 16. If any pixels remain to be processed (decision 129), the process loops back to decision 120. Otherwise, the process returns to FIG. 3, block 72 or 74.

If, on the other hand, the pixel 16 under test is not inside the boundary of the second area 20 (i.e., it is in the first, presumably less important, area 18), it is determined at block 126 whether the sampling interval threshold, defined either by the operator of the system 10 or the automatic method disclosed below in relation to FIG. 7, has been reached. In the presently preferred embodiment, the sampling interval threshold is less than about thirty standard video program sampling cycles, i.e., the sampling interval threshold is less than about one second.

If the sampling interval threshold has been reached, the process moves to block 128, wherein the pixel 16 is saved for processing at block 76 of FIG. 3. The process then moves to block 124 to retrieve the next pixel 16 and either loops via 129, 120, or returns to FIG. 3, block 72 or 74. If, at block 126, the sampling interval threshold has not been reached, the process moves to block 130 to apply a null value to the pixel 16 under test. Stated differently, the pixel 16 under test is suppressed from further processing at block 130. From block 130, the process moves to block 124 to retrieve the next pixel 16 and either loops via 129, 120, or returns to FIG. 3, block 72 or 74.

Thus, it can now be appreciated that with the sampling feature shown in FIG. 6, not only can the pixels 16 in the first area 18 be compressed relatively more than the pixels 16 in the second area 20, but that the compression of the pixels 16 in the first area 18 occurs less frequently than the compression of the pixels 16 in the second area 20. Stated differently, the pixels 16 in the first area 18 are processed each sampling time interval, whereas the pixels 16 in the second area 20 are processed each sampling cycle.

Figure 7:
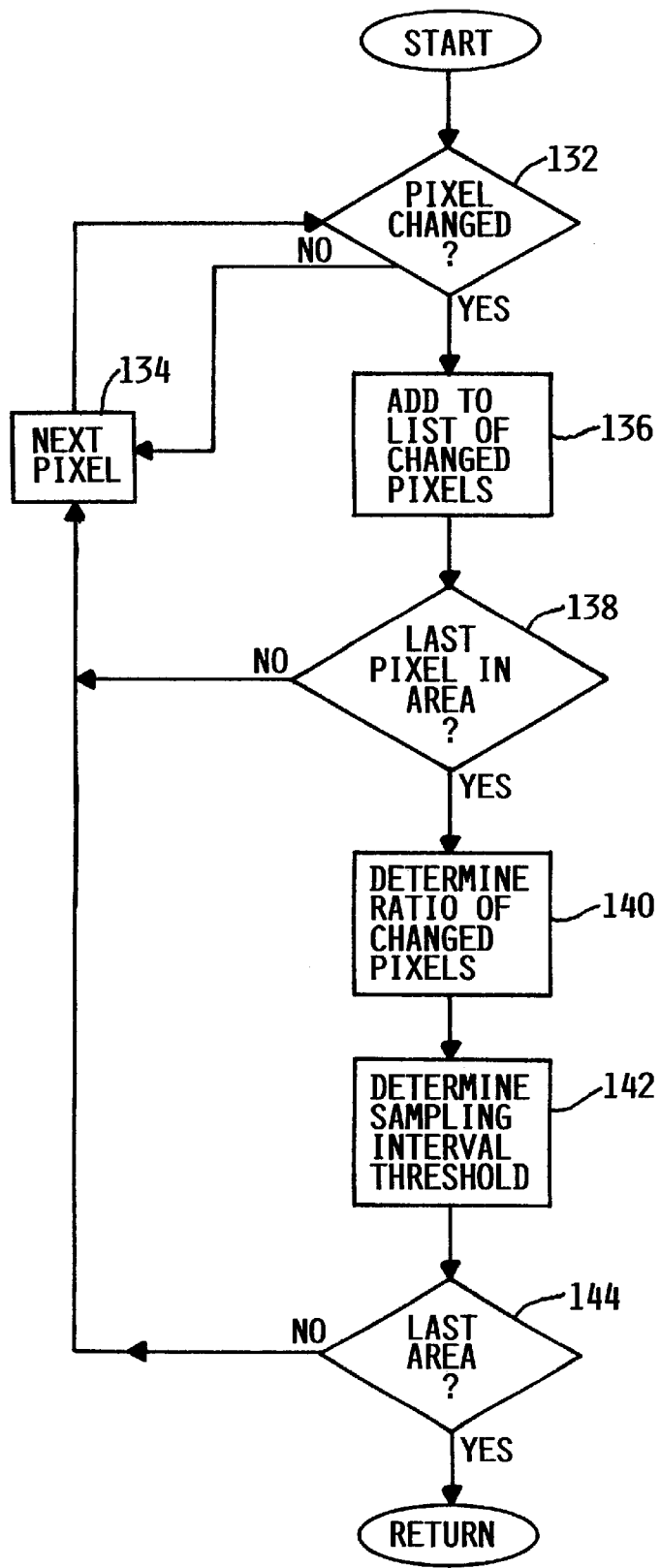
FIG. 7 is a flow chart of the autofocus sampling rate method for automatically determining the sampling interval threshold.

Now referring to FIG. 7, if automatic rate establishment had been selected by the operator of the system 10 at block 82 in FIG. 1 for either one or both of the areas 18, 20, at block 132 in FIG. 7 it is determined whether the value of the pixel 16 under test has changed since the immediately preceding image frame. If it has not changed, the next pixel 16 is retrieved at block 134. If the value of the pixel 16 under test has changed, then the pixel 16 is added to a list of changed pixels at block 136.

Next, at block 138, it is determined whether the pixel 16 under test is the last pixel in the area 18, 20 for which a sampling interval threshold is being defined. If it is, the process moves to block 134. Otherwise, the process moves to block 140, wherein the ratio of the number of changed pixels 16 to unchanged pixels 16 in the particular area 18, 20 under test is determined. Then, at block 142, a sampling interval threshold is determined based upon the ratio determined in block 140. This determination can be done by table look-up or other appropriate method.

From block 142, the process moves to block 144 to determine whether the area 18, 20 is the last area for which a sampling interval threshold is to be determined. If it is not, the process moves to block 134 to retrieve the first pixel 16 in the next area for which a sampling interval threshold is to be determined. Otherwise, the process returns to FIG. 3, block 86.

While the particular apparatus and method for processing video data as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer system for processing a video image, comprising:
   a central processing unit (CPU);
   a data record having a plurality of elements representing a plurality of pixels arranged in a matrix, the data record being accessible by the CPU;
   a boundary definer for establishing first and second areas of the matrix in response to operator input identifying the first and second areas, the boundary definer also for inserting into the data record, codes which indicate whether the pixels associated with the elements that follow reside in the first or second area;
   a locator operably engaged with the boundary definer for determining, for at least some of the pixels, which of the pixels are located in the first area and which of the pixels are located in the second area; and
   a pixel processor operably engaged with the locator for processing the elements representing the pixels in a row order of the matrix such that elements representing pixels in the first area are processed in accordance with a first processing scheme and elements representing the pixels in the second area are processed in accordance with a second processing scheme.

2. The system of claim 1, wherein the pixel processor generates a bit stream representative of the pixels in the row order and the area of each pixel.

3. The system of claim 2, further comprising an I/O device for selectively causing the bit stream to be stored or transmitted.

4. The system of claim 3, wherein the bit stream representing the pixels in the first area is compressed relative to the number of pixels in the first area.

5. The system of claim 1, wherein a video program defines a sampling cycle, and the system further comprises a timer for establishing a sampling interval threshold longer than the sampling cycle and the pixel processor processes the elements representing the pixels in the second area each sampling cycle, and the pixel processor processes the elements representing the pixels in the first area each sampling interval threshold.

6. The system of claim 5, wherein each pixel defines a corresponding variable value, and the boundary definer establishes the first and second areas in response to variations in the values of the pixels.

7. An apparatus for processing a matrix of data elements representing an image, comprising:
   means for establishing first and second areas of the image;
   means for receiving input from an operator indicating which of the elements are located in the first area and which of the elements are located in the second area;
   means responsive to the input received from the operator for inserting into the matrix of data elements, codes which indicate in which area the pixels represented by the data elements that follow reside; and means for processing the elements in a row order of the matrix such that elements in the first area are processed in accordance with a first processing scheme and elements in the second area are processed in accordance with a second processing scheme.

8. The apparatus of claim 7, wherein the means for processing generates a bit stream representative of the elements in the row order and the area of each, the apparatus further comprises means for selectively causing the bit stream to be stored or transmitted, and the bit stream representing the elements in the first area is compressed relative to the number of elements in the first area.

9. The apparatus of claim 8, further comprising means for establishing a sampling cycle and a sampling interval threshold, wherein the sampling interval threshold is longer than the sampling cycle and the means for processing processes the elements in the first area each sampling cycle, and the means for processing processes the elements in the second area each sampling interval threshold.

10. The apparatus of claim 9, wherein each element defines a corresponding variable value, and the means for establishing establishes the first and second areas in response to variations in the values of the elements.

11. A method for processing data representing pixels arranged in a matrix, comprising the steps of:
    (a) defining at least first and second areas within the matrix;
    (b) determining which pixels are within the first area and which pixels are within the second area in response to operator input;
    (c) inserting into the data representing the pixels, codes which indicate in which area the pixels represented by the data that follows reside;
    (d) processing the data representing pixels in the first area in accordance with a first processing scheme;
    (e) processing the data representing pixels in the second area in accordance with a second processing scheme; and
    (f) performing steps (d) and (e) according to a row order of the matrix.

12. The method of claim 11, further comprising the step of:
    (f) establishing a sampling cycle and a sampling interval threshold longer than the sampling cycle; and
    (g) processing the data representing pixels in the second area each sampling cycle and processing the data representing pixels in the first area each sampling interval threshold.

13. The method of claim 12, wherein each pixel defines a corresponding variable value, and the method further includes establishing the first and second areas in response to variations in the values of the pixels.

14. A system for processing pixels of a video image defining a sampling cycle, comprising:
    a data record including a matrix of pixels representing an image, the matrix being defined by at least first and second areas, the data record further including codes inserted in the matrix of pixels in response to operator input to indicate in which area the pixels that follow reside;
    a timer for establishing a sampling interval threshold longer than the sampling cycle;
    a pixel processor for processing the pixels in a row order of the matrix, in which pixels in the first area are processed each sampling cycle and pixels in the second area are processed each sampling interval threshold.

15. The system of claim 14, wherein each pixel defines a corresponding variable value, and the system further comprises a boundary definer for establishing the first and second areas in response to variations in the values of the pixels.

16. A method for processing pixels, comprising:
    (a) providing a data record including a matrix of pixels in row order representing an image, the matrix being defined by at least first and second areas and having codes inserted therein in response to operator input to indicate in which area the pixels that follow reside;
    (b) establishing a sampling cycle and a sampling interval threshold, wherein the sampling interval threshold is longer than the sampling cycle;
    (c) processing the pixels in the first area each sampling cycle; and
    (d) processing the pixels in the second area each sampling interval threshold.

17. The method of claim 16, wherein each pixel defines a corresponding variable value, and the method further comprises:
    (e) establishing the first and second areas in response to variations in the values of the pixels.

18. A method for processing pixels arranged in a two-dimensional matrix, comprising:
    establishing first and second areas of the matrix;
    receiving operator input to indicate which of the pixels are located in the first area and which of the pixels are located in the second area;
    inserting into the matrix, codes that indicate in which area the pixels that follow reside, in response to the input received from the operator; and
    processing the pixels in a row order of the matrix such that pixels in the first area are processed in accordance with a first processing scheme and pixels in the second area are processed in accordance with a second processing scheme.

19. The method of claim 18, further comprising:
    generating a bit stream representative of the pixels in the row order and the area of each pixel;
    selectively causing the bit stream to be stored or transmitted; and
    compressing the bit stream representing the pixels in the first area.

20. The method of claim 19, further comprising:
    establishing a sampling cycle and a sampling interval threshold longer than the sampling cycle;
    processing the pixels in the second area each sampling cycle; and
    processing the pixels in the first area each sampling interval threshold.

21. The method of claim 20, wherein each pixel defines a corresponding variable value, and the first and second areas are established in response to variations in the values of the pixels.

* * * * *

UNITED STATES PATENT AND TRADEMARK OFFICE
CERTIFICATE OF CORRECTION

PATENT NO. : 6,501,853 B1  Page 1 of 1
DATED : December 31, 2002
INVENTOR(S) : Leon Edward Gregg and William Jaaskelainen It is certified that error appears in the above-identified patent and that said Letters Patent is hereby corrected as shown below:

<u>Title page, Item [54] and Column 1, lines 1 and 2,</u>
Should read:

-- APPARATUS AND METHOD FOR PROCESSING VIDEO PIXEL DATA --

Signed and Sealed this

Twenty-seventh Day of May, 2003

JAMES E. ROGAN
*Director of the United States Patent and Trademark Office*